US006355301B1

(12) United States Patent
Miller

(10) Patent No.: US 6,355,301 B1
(45) Date of Patent: Mar. 12, 2002

(54) SELECTIVE FIBER METALLIZATION

(75) Inventor: Michael Nevin Miller, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/705,224

(22) Filed: Nov. 2, 2000

(51) Int. Cl.$^7$ .............................. B05D 3/10; B05D 1/18; B05D 1/32; B05D 1/38; B05D 7/00
(52) U.S. Cl. .................... 427/163.2; 427/264; 427/271; 427/404; 427/437; 427/438; 427/443.1; 427/434.6; 427/304
(58) Field of Search ................................ 427/264, 261, 427/272, 284, 304, 404, 437, 438, 443.1, 434.6, 163.2, 271

(56) References Cited

U.S. PATENT DOCUMENTS

| | | | |
|---|---|---|---|
| 3,632,435 A | | 1/1972 | Eriksson et al. ............ 117/212 |
| 3,672,925 A | | 6/1972 | Feldstein ..................... 117/5.5 |
| 3,775,121 A | * | 11/1973 | Sharp .......................... 96/38.4 |
| 4,138,267 A | * | 2/1979 | Arisato et al. ............. 106/1.23 |
| 4,448,804 A | | 5/1984 | Amelio et al. ................. 427/98 |
| 4,707,065 A | | 11/1987 | Jenkins ...................... 350/96.2 |
| 4,824,693 A | * | 4/1989 | Schlipf et al. ................ 427/98 |
| 5,063,194 A | * | 11/1991 | Broecker et al. ........... 502/314 |
| 5,167,992 A | * | 12/1992 | Lin et al. .................... 427/437 |
| 5,380,559 A | * | 1/1995 | Filas et al. .................. 427/305 |
| 5,793,916 A | | 8/1998 | Dahringer et al. ............ 385/95 |
| 6,187,378 B1 | * | 2/2001 | Doncsecz ................ 427/163.2 |

OTHER PUBLICATIONS

Proceedings of the 50$^{th}$ Electronic Components and Technology Conference, May 21–24, 2000, pp. 250–255.
EEP–vol. 19–1 Advances in Electronic Packaging 1997, vol. 1 pp. 1265–1282.

* cited by examiner

*Primary Examiner*—Michael Barr
(74) *Attorney, Agent, or Firm*—Allen Ball; Gary L. Griswold; Geraldine F. Chernivec

(57) ABSTRACT

A process for applying a metal to selected areas of non conducting substrates, including individual fibers, particularly optical fibers, comprises the steps of providing a non-conducting substrate having an uncoated portion to be treated with a sensitizer solution to provide a sensitized portion of the non-conducting substrate. Covering the sensitized portion with an activator solution provides an activated portion of the non-conducting substrate. Coating at least a section of the activated portion with a stannous salt solution forms at least one activated area and at least one deactivated area within the activated portion of the non-conducting substrate to produce a masked portion therefrom. Upon immersing the masked portion of the non-conducting substrate in an electroless plating bath, metal deposits on the activated area to provide a selectively metallized non-conducting substrate. This process provides selectively metallized articles including selectively metallized optical fibers.

13 Claims, No Drawings

SELECTIVE FIBER METALLIZATION

FIELD OF THE INVENTION

The invention relates to electroless deposition of metal layers on non-conducting, generally amorphous substrate materials and more particularly to selective deposition of metal on fibrous structures using a process to deactivate catalytic species in selected areas not requiring deposition of electroless metal.

BACKGROUND OF THE INVENTION

Methods for electroless deposition of metals on a variety of substrate materials have been known since the earliest use of aldehydes to precipitate silver from solutions containing silver salts. More recently, the use of electroless plating methods has received attention following the discovery that some alloys, such as electroless deposited nickel phosphorus alloys, possess unique properties, and because of the growing use of such methods for plating plastics, and manufacturing optical, electronic and optoelectronic devices. Optical communication represents an area of use wherein selective coating of metal on glass facilitates hermetically sealed soldered connection of optical fiber ends to ferrule bodies.

Electroless plating solutions usually contain a metal salt, a reducing agent, a pH adjuster, a complexing agent, and one or more additives to control properties including bath stability, film properties, and metal deposition rate. An ideal electroless plating solution deposits metal only on an immersed article, never as a film on the sides of the tank or as a fine powder. All parts of an immersed article must have been thoroughly cleaned before plating. The presence of dirt or oxide on an article may either interfere with uniform deposition or lead to loss of adhesion of the metal deposit.

Application of metal to non-conductors requires the presence of a seed material in contact with the surface of a thoroughly cleaned article to provide a catalytic site for electroless metal deposition. Activation of a surface of non-conducting and dielectric materials for electroless metal plating commonly uses solutions containing acidic stannous chloride and acidic palladium chloride. The original catalysts were separate solutions with acidic stannous chloride acting as a reducing agent for subsequently applied palladium chloride to produce catalytic sites of metallic palladium at the surface of a cleaned article. It is the physical presence and chemical activity of the palladium that is a prerequisite for initiation of the electroless plating process. The two-step catalyst system may be replaced by a catalyst solution containing pre-reacted palladium and stannous chlorides.

U.S. Pat. No. 3,632,435 confirms the use of tin and palladium salts for surface activation and further includes the use of salts of other noble metals in the place of palladium. This reference also addresses deactivation or masking of selected portions of a catalyzed surface that was activated using stannous and palladium ions as previously described. Deactivation, in this case, involves the application of destabilizing agents. One category of destabilizing agents includes polyvalent hydrolysable metal ions, such as lead, iron and aluminum, which have the capacity to oxidize stannous ions to stannic ions. Stannic ions do not react with palladium solutions to produce catalytic sites of elemental palladium for deposition of electroless metal layers.

Chelating agents for noble metals include organic compounds, e.g. dibasic acids, containing acid functionality to provide another type of destabilizing agent according to U.S. Pat. No. 3,632,435. The acidic chelating agent acts primarily on the noble metal, e.g. palladium, of a catalyzed surface to mask its catalytic behavior thereby preventing electroless metal deposition in treated areas. Acid treatment may be used in other cases to facilitate electroless plating of an overcoat plating on metal conductors while preventing metal deposition on dielectric material surrounding the metal conductors. U.S. Pat. No. 5,167,992 uses a deactivator acid solution to remove noble metal ions from dielectric surfaces after treatment with solutions of noble metal salts. Suitable deactivator acids include organic acids and inorganic acids. It should be noted that an activator solution according to U.S. Pat. No. 5,167,992 contains no tin and that deactivation involves removal of ionic not elemental noble metal.

Other methods for selective electroless plating of non-conducting substrates include imagewise exposure of photoresists followed by development and activation of exposed areas of a substrate. Such methods, as taught by U.S. Pat. Nos. 3,672,925 and 4,448,804, are beyond the scope of the present invention.

The use of optical fiber signal carriers frequently involves sealing an optical fiber into the bore of an optical fiber connecting component such as a ferrule. Preferably the optical fiber becomes hermetically sealed within the component as described in U.S. Pat. Nos. 4,707,065 and 5,793,916. In each case, the optical fiber has a surface layer of metal, usually gold, suitable for bonding and sealing with a low melting metal, preferably solder.

An article published in the Proceedings of the 2000 Electronic Components and Technology Conference (Watson, J. E. et al, 2000 Proceedings. $50^{th}$ Electronic Components and Technology Conference, May 21–24, 2000, p. 250–5.) describes the use of electroless plating for applying metal to the surface of an optical fiber. An assembly of a metallized fiber sealed into a ferrule was tested to assess the strength of the fiber and how an assembly might fail. U.S. Pat. No. 5,380,559 describes activation of a single fiber end and a plurality of optical fiber ends for more consistent electroless metal deposition using stannous fluoride instead of stannous chloride to generate catalytic sites of elemental palladium. According to the reference (U.S. Pat. No. 5,380,559), with the standard use of stannous chloride, for electroless plating, it is not possible to obtain reproducible, uniform plating of electroless nickel on silica fibers.

In view of the use of electroless plating processes for coating non-conductive surfaces with metal, and the use of such processes with optical fibers and related components, there is a need for application of electroless metal to selected areas of an optical fiber end prior to sealing a fiber into an optical connecting component using solder. The present invention has been developed as a simplified selective electroless metallizing process with improved efficiency as a further benefit to the user. These enhancements and benefits are described in greater detail hereinbelow with respect to several alternative embodiments of the present invention.

SUMMARY OF THE INVENTION

This invention provides an electroless plating process for sequential surface masking and deposition of nickel and gold onto single and multiple fibers using aqueous chemistry. The process includes a sensitization of a surface of a fiber, preferably an optical fiber, using a dilute aqueous solution of stannous chloride in de-ionized water. Subsequent treatment includes immersion of the sensitized optical fiber in an aqueous solution of palladium chloride/ hydrochloric acid followed by selective deactivation of the treated fiber during a second immersion of a fiber in an aqueous solution of stannous chloride. During electroless plating from commercially available electroless nickel and optionally immersion gold solutions, metal deposits only on areas of an optical fiber surface that remain activated. The formation of hermetic solder joints to the metallized fiber may be determined by helium leak testing. After soldering, solder pull-test strengths typically range from 1.4–2.3 kg (3–5 pounds), depending on the type of solder used.

For treatment of non conducting substrates, including individual fibers, especially optical fibers, the present invention provides a process for applying a metal to selected areas of a non-conducting substrate. The process comprises the steps of providing a non-conducting substrate having an uncoated portion to be treated with a sensitizer solution to provide a sensitized portion of the non-conducting substrate. Covering the sensitized portion with an activator solution provides an activated portion of the non-conducting substrate. Coating at least a section of the activated portion with a stannous salt solution forms at least one activated area and at least one deactivated area within the activated portion of the non-conducting substrate to produce a masked portion therefrom. Upon immersing the masked portion of the non-conducting substrate in an electroless plating bath metal deposits on the activated area to provide a selectively metallized non-conducting substrate. As indicated previously this process provides selectively metallized non-conducting fibers including selectively metallized optical fibers.

A process for applying a metal to selected areas of a plurality of optical fibers comprises a sequence of steps including providing a plurality of optical fibers having uncoated portions in an array having a separation between fibers and sensitizing the surface of each uncoated portion using a sensitizer solution. This provides sensitized portions of the plurality of optical fibers for treatment with an activator solution to provide activated portions of the plurality of optical fibers. Coating at least a section of each of the activated portions with a stannous salt solution forms at least one activated area and at least one deactivated area within each of the activated portions to provide masked portions therefrom. Immersing the masked portions of the plurality of optical fibers in an electroless plating bath deposits a metal on the activated area of each of the activated portions to provide selectively metallized fibers.

The present invention further provides a selectively metallized article including a non-conducting substrate, preferably an optical fiber, wherein production of the selectively metallized article uses a process as previously described. The process comprises the steps of providing a non-conducting substrate having an uncoated portion to be treated with a sensitizer solution to provide a sensitized portion of the non-conducting substrate. Covering the sensitized portion with an activator solution provides an activated portion of the non-conducting substrate. Coating at least a section of the activated portion with a stannous salt solution forms at least one activated area and at least one deactivated area within the activated portion of the non-conducting substrate to produce a masked portion therefrom. Upon immersing the masked portion of the non-conducting substrate in an electroless plating bath metal deposits on the activated area to provide the selectively metallized article.

Definitions

The following definitions clarify the meaning of terms used herein:

The terms "buffer" or "buffering" refer to a protective material extruded directly on the coating of an optical fiber to protect it from the environment and reduce damage by impact or other forms of physical stress.

Use of the terms "coating" or "fiber coating" refers to a material put on a fiber during the draw process to protect it from the environment and handling.

The terms "stripping" or "fiber stripping" refer to the removal of buffer and coating materials surrounding an optical fiber to expose the bare surface of the fiber.

The term "sensitization" refers to the process of applying a sensitizing solution, such as stannous chloride, to an optical fiber to form an adherent sensitizer coating that remains on the fiber after rinsing to provide a sensitized fiber.

As used herein the term "activation" refers to immersion of a sensitized fiber in an activator solution of palladium. Reference to palladium also implies the use of an alternate noble metal solution for activation. During immersion, the sensitizer coating of e.g. stannous chloride reacts with the palladium solution causing deposition of elemental palladium corresponding to the area covered by the adherent sensitizer coating.

Use of the term "catalytic site" refers to a palladium atom, or cluster of palladium atoms sufficient to initiate deposition of a metal from an electroless metal plating solution.

The terms "selective deactivation" or "masking" refers to treating selected catalytic sites to make them ineffective for initiating electroless metal plating.

Use of the term "hermetic sealing" refers to a substantially impervious seal, preferably a soldered seal, between a metallized surface of an optical fiber and the inside surface of a through-hole formed in a fiber interconnection component such as a ferrule.

The metallization process, according to the present invention may be applied advantageously to substrates of thermosetting or thermoplastic resins, silica, doped silica or glass.

The beneficial effects described above apply generally to the exemplary devices and mechanisms disclosed herein of selectively metallized optical fibers. The specific structures through which these benefits are delivered will be described in detail hereinbelow.

DETAILED DESCRIPTION OF THE INVENTION

The invention embodies a reproducible electroless plating process for selective metallization of non conducting substrates including filaments, preferably in the form of optical fibers. Metallized optical fibers according to the present invention exhibit greater strength than current product that uses a sputtered titanium/platinum/gold coating. Also, the metallization process provides optical fibers having a surface coating of metal in selected areas to allow solder bonding of fibers to other surfaces.

Optical fiber processing, according to the present invention, includes the steps of immersing bare portions of an optical fiber to be metallized in a solution of from about 5.0 g/L to about 20 g/L, preferably 10 g/L stannous chloride, in acidified de-ionized water containing 40 ml of 35% hydrochloric acid per liter. A rinse with de-ionized water removes any unadsorbed stannous chloride. Upon immersion of the stannous chloride treated portion of an optical fiber in an aqueous activating solution of palladium chloride in hydrochloric acid, stannous ions reduce palladium ions to provide catalytic sites of elemental palladium for electroless metal deposition. Preferably the palladium chloride solution contains from about 0.1 g/L to about 0.5 g/L, preferably 0.25 g/L palladium chloride in dilute aqueous hydrochloric acid. Acid strength may vary from greater than 0.01 M to less than 0.1 M, preferably 0.03 M hydrochloric acid. After rinsing in de-ionized water, selected areas of the activated surface of an optical fiber lose their activity upon contact with an acidified aqueous solution of stannous chloride. Without intending to limit the stannous chloride deactivator solution to a particular composition, palladium deactivation may use a solution of the same chemical composition as that used originally to sensitize an optical fiber. Selective deactivation of areas of an activated optical fiber may also be referred to herein as masking of the optical fiber. When immersed in an electroless nickel plating bath, metallic nickel deposits only on those areas of the optical fiber that remain activated with elemental palladium. Nickel plating continues for a period sufficient to produce a surface layer of nickel from about 1 to about 20 μm, preferably about 3 to about 5 μm thick. Following removal from the nickel electroless plating bath, and rinsing in water, previously metallized portions of an optical fiber receive a thin layer of a metal such as gold to provide a protective covering over the nickel layer. The gold layer deposits during dipping of the selectively nickel-plated fiber into an immersion gold bath for a period sufficient to form a gold coating about 0.1 to about 1 μm thick, preferably about 0.7 μm thick over the nickel layer. A final rinse in de-ionized water provides a gold coated metallized optical fiber suitable for forming a soldered hermetic seal.

A metallization process according to the present invention may be applied to individual optical fibers or to a plurality of fibers. Holders are preferred for arranging a plurality of fibers in a suitable array having bared ends of fibers exposed following removal of protective fiber coating. The holders provide fixtures that facilitate sequential transfer of attached fibers through the chemical treatment baths and de-ionized water rinse baths needed to produce nickel and gold plated metallized optical fibers. Suitable optical fiber holders allow positioning of the fibers so that only a desired length, or masked portion, of each fiber end becomes submerged in the treatment solution or de-ionized rinse water. Use of a plurality of fibers or filaments increases the output of selectively metallized optical fibers. Uniformity of positioning of a selectively metallized optical fiber portion, produced by simultaneous processing of a plurality of fibers, requires a minimum separation of 1 mm between individual fibers. Further reduction of spacing could result in uneven metallization due either to fibers touching each other or to the effect of surface tension that impairs fluid penetration of liquid treatment compositions into an array of close-packed fiber ends.

Although electroless metallization processes according to the present invention may be used with any of a variety of optical fibers, exemplary fibers include telecommunications-grade single-mode fibers and polarization-maintaining fibers. A preferred single-mode fiber is available from Corning Inc. as SMF28, which has a dual acrylate buffer over a 125 μm diameter glass fiber.

A preliminary step to electroless metallization of an optical fiber is the removal of the polymer buffer and/or coating from a prescribed length of either an individual fiber or a plurality of fibers. Reference to a prescribed length may include a central section of a fiber, but commonly pertains to an optical fiber end. The acrylate buffer over a SMF28 fiber is readily dissolved by hot, about 95% concentrated sulfuric acid solution. The time for removal of the buffer and/or coating varies with the temperature of the acid but is preferably about 60 seconds at 150° C. Following complete removal of the polymer jacket or buffer, rinsing of the bare fiber involves dipping it in de-ionized water for about 60 seconds, then drying it for about 60 seconds under ambient conditions.

Once stripped, the bare portions of the fibers are treated with a solution of stannous chloride (e.g. 10 g stannous chloride in a liter of 0.4M hydrochloric acid) by immersion for about 3–6 minutes at ambient temperature. Adhesion of the stannous chloride to the surface of the optical fiber occurs without any physical abrasion of the fiber surface. Stannous chloride is available in crystalline form from Sigma-Aldrich Corporation of St. Louis, Mo. Use of the term sensitizer or sensitizing solution herein refers to the stannous chloride solution which, after application to an optical fiber and drying, provides a layer of stannous ions on the fiber surface. Optical fibers coated in this way may be referred to as sensitized fibers or as having sensitized portions. Solutions of stannous chloride according to the present invention remain active for several weeks without protection from the ambient environment as by storing under gaseous nitrogen. Regardless of previous reports, stannous chloride sensitization according to the present invention yields uniform metal plating of bare optical fibers.

Activation of the surface of a sensitized optical fiber occurs, after rinsing the fiber with de-ionized water, by immersion of the sensitized portion of the fiber in an activating solution containing 0.25 g of palladium chloride per liter of 0.03M hydrochloric acid in de-ionized water. The surface of the optical fiber becomes activated for electroless metallization during reduction of palladium ions to elemental palladium by reaction of palladium chloride with stannous chloride deposited on a sensitized fiber or a sensitized portion of an optical fiber. At this stage, the surface of the activated portion of the fiber has a covering of catalytic sites of palladium. Conversion of a sensitized fiber to an activated fiber requires from about 3–6 minutes of immersion in the palladium chloride activation solution. Palladium chloride was a 99.9 percent palladium (II) chloride obtainable from Sigma-Aldrich Corporation of St. Louis, Mo.

A distinguishing feature of the present invention is the discovery that the activated surface of an optical fiber may be deactivated, after rinsing with de-ionized water, by dipping the fiber in a second stannous chloride bath. Stannous chloride deactivator solutions of various concentrations have been found effective, including the same composition as the stannous chloride sensitizing solution. The deactivation step according to the present invention facilitates selective masking of a portion of an activated fiber whereby subsequent electroless metal deposition takes place only over areas of the fiber surface that remain activated after treatment with tin(II) solution. Use of tin(II) deactivation produces a masked fiber by dipping an activated optical fiber in a solution of acidified stannous chloride for about 1–60 seconds, preferably about 15 seconds. This obviates the need for the traditional use of a strippable, protective polymer coating for masking areas of a fiber surface, as taught by U.S. Pat. No. 5,380,559. Whereas tin solutions have been known for sensitization, as previously described, the use of solutions of stannous salts, for surface deactivation to electroless metal deposition, improves fiber masking by reducing the number of steps to produce a selectively metallized optical fiber.

A masked optical fiber includes one or more activated areas and one or more deactivated areas. Following a de-ionized water rinse, for about 10–20 seconds, and fiber drying under ambient conditions, for about 40–90 seconds, preferably 60 seconds, metal coating of the activated areas occurs during immersion of the masked portion of a fiber in an electroless metal plating bath. Application of a suitable thickness of metal requires immersion for about 10–20 minutes at about 80–90° C., preferably about 88° C. The nickel plating solution is preferably NIMUDEN SX, a two-part plating solution commercially available from Uyemura International Corporation. The two-part composition consists of a part A, containing nickel sulfate and part M containing sodium hypophosphite. In preparation for electroless nickel plating addition of part A and part M to 18 MΩ de-ionized water provides a solution having a pH from about 4.5 to about 4.8. Preferably the resulting solution has a pH of 4.6 and contains 5.5% by volume NIMUDEN SX part A, 10% by volume NIMUDEN SX part M and 84.5% de-ionized water.

The thickness of electroless plated nickel continues to increase the longer the activated material remains in contact with the nickel plating solution. A nickel thickness of about 3 μm is sufficient for soldering with a commonly used tin solder containing a ratio of 97% tin to 3% silver. Therefore, 20 minutes immersion in the nickel bath, to give about 5 μm nickel deposit, would be a conservative compromise for all potential solders. Whenever part M of the nickel solution includes hypophosphite ion as the reducing agent, phosphorus is deposited at the catalytic surface and is incorporated into the nickel to form a nickel-phosphorous alloy. The nickel deposit from the above solution included phosphorous in an amount of from 9 to 11 weight percent.

Nickel-plated fibers produced according to the present invention may require the application of a layer of gold to improve compatibility of metallized optical fibers with the low melting alloys used to form solder seals. Application of the required gold layer follows an extended rinse of a nickel coated fiber in de-ionized water. Rinsing continues for between about 30–120 seconds, preferably about 60 seconds to remove any residual nickel ions from the surface of the metallized portion of the optical fiber. A preferred immersion gold solution for developing a suitable thickness of gold in contact with the nickel coated portion of an optical fiber is AURUNA-511 available from Uyemura International Corporation. This commercially available solution, supplied as a concentrate, requires about a four-fold dilution to provide the operative gold plating solution. Also, the gold plating is self-limiting. Immersion for about 8 minutes with gentle stirring in an 85° C. temperature controlled gold solution bath gives a gold deposit about 0.7 μm thick. The gold-plated portions of the fiber are finally rinsed with water, and dried.

A specific example of a flow chart of an embodiment of the above process may be summarized as follows. The embodiment involves an array of a plurality of fibers subjected to a sequence of processes including solution treatments and rinses preferably with de-ionized water.

(a) providing an array including a plurality of optical fibers;

(b) stripping the buffer coat from the plurality of fibers using a strong acid solution, preferably a hot, about 95% concentrated sulfuric acid solution heated to a temperature of 150° C. to provide a plurality of stripped fibers;

(c) rinsing the stripped fibers with de-ionized water;

(d) drying the stripped fibers;

(e) sensitizing the surface of each of the plurality of stripped fibers using a solution containing a stannous salt to provide tin coated sensitized fibers;

(f) rinsing the sensitized fibers with de-ionized water;

(g) treating the sensitized fibers with a solution containing a palladium salt to form a layer of catalytic palladium on the surface of each of the sensitized fibers to provide activated fibers;

(h) rinsing the activated fibers with de-ionized water;

(i) dipping the activated fibers in a solution containing a stannous salt until a selected length of each of the catalytic fibers is covered by the stannous salt solution to produce a plurality of masked fibers;

(j) rinsing the masked fibers with de-ionized water (k) drying the masked fibers;

(l) depositing electroless nickel from a plating bath at a temperature of 88° C. to provide metal coated fibers;

(m) rinsing the metal coated fibers with de-ionized water;

(n) optionally applying an immersion gold coating to the metal coated fibers to provide gold plated fibers; and (o) rinsing the gold plated fibers with de-ionized water.

Metal layer thicknesses were determined from scanning electron microscope (SEM) micrographs of cross sections of polished ends of metallized fibers held in epoxy mounting blocks. The thickness of the metal coating was determined by direct measurement from the micrographs.

Interconnection of metallized optical fibers according to the present invention uses ferrule bodies included as components of optical fiber connectors. Ferrule bodies may comprise a metal alloy including iron, cobalt and nickel, preferably KOVAR® alloy having a low coefficient of thermal expansion. Optical fibers having surface coatings of either nickel-phosphorus or gold may be sealed in to KOVAR® ferrules using a soft solder to form a hermetic seal around the fiber, inside the ferrule. Formation of a soldered hermetic seal involved threading a metal plated optical fiber into a ferrule 1 mm long having a through-hole 190 μm in diameter. During the soldering process the ferrule was placed with the through-hole in a vertical orientation. A pocket around the fiber hole or through-hole held an annular solder preform. The solder preform melted at an elevated temperature produced by controlled heating of the KOVAR® ferrule preferably using an electric current. Hermetic seal formation occurred during observation of the condition of the solder preform. The heating current was discontinued upon evidence of solder flow into the joint around the optical fiber. Seal formation typically requires from about 4–5 seconds.

Solder pull strengths and hermeticity tests of plated fibers indicate hermetic solder joints (based on helium leak tests to about $10^{-9}$ atm cc/sec) even after temperature cycling. Pull strengths may vary with the solder used but are typically in the range of about 1.0–1.75 kg (2.5–3.5 pounds) for 80% gold/20% tin solder. The rigidity of gold/tin solder favors its use in high reliability products but it may also develop higher stress concentration at the edge of the solder joint.

Additional advantages and modifications will readily occur to those skilled in the art. Accordingly, various modifications may be made without departing from the spirit or scope of the general inventive concept as defined by the appended claims and their equivalents.

EXPERIMENTAL

Solution Preparation

Acid Stripping Solution:

Removal of protective layers from an optical fiber preferably requires the use of a concentrated acid solution containing about 95% sulfuric acid. The rate of optical fiber stripping varies with temperature and is preferably about 60 seconds at 150° C.

Sensitizer Solution:

A 10 g quantity of stannous chloride was added to 200 ml of 2M hydrochloric acid in de-ionized water. Upon dilution to 1 liter, with de-ionized water, this provided the sensitizer solution included in the electroless metallization process according to the present invention.

Activator Solution:

Palladium chloride (0.25 g) was added to 100 ml of 0.3M hydrochloric acid. The resulting solution, diluted to 1 liter, provided the activator solution for application to a stannous chloride sensitized optical fiber.

Deactivator Solution:

Acidic deactivator solution compositions may vary in amounts of tin salt per liter of hydrochloric acid, e.g. from between about 0.5 g to about 200 g stannous chloride. Solutions may be prepared using hydrochloric acid of varying strengths including from about 0.05M to 5M. Lower tin or acid concentrations may lead to incomplete masking. Higher tin or acid concentrations may cause unwanted masking of areas above the solution interface.

Electroless Nickel Plating Solution:

A commercially available electroless nickel plating solution, NIMUDEN SX from Uyemura International Corporation, was used to deposit a nickel-phosphorus composition on activated portions of optical fibers.

Immersion Gold Solution:

AURUNA-511 immersion gold from Uyemura International Corporation provided the optional gold coating needed in some cases for successful solder seal formation.

Properties of Metallized Fibers

Metal coating weight/thickness:

The nickel layer was about 2.0 $\mu$m to about 3.0 $\mu$m thick comprising a nickel—phosphorus alloy containing from about 9 wt % to about 11 wt % phosphorus.

The immersion gold layer had a thickness from about 0.3 $\mu$m to about 0.7 $\mu$m.

Solderability:

Metallized optical fibers were sealed inside KOVAR® ferrules, as previously described, using a solder composition of 80% Au/20% Sn at a temperature of 320° C.±15° C.

Hermetic sealing:

Metallized fibers sealed into KOVAR® ferrules passed an open face leak test down to $1 \times 10^{-8}$ atm cc/sec of helium.

Fiber pull data:

Metallized fibers soldered in a gold plated KOVAR® standard 14-pin package have a minimum pull strength of 350 g with no separation of the metallization from the fiber.

What is claimed is:

1. A process for applying a metal to selected areas of a non-conducting substrate, comprising the steps of:

providing a non-conducting substrate having an uncoated portion;

treating said portion with sensitizer solution to provide a sensitized portion of said non-conducting substrate;

covering said sensitized portion with an activator solution to provide an activated portion of said non-conducting substrate;

coating at least a section of said activated portion with a stannous salt solution to form at least one activated area and at least one deactivated area within said activated portion to produce a masked portion therefrom; and immersing said masked portion of said non-conducting substrate in an electroless plating bath to deposit a metal on said at least one activated area to provide a selectively metallized non-conducting substrate.

2. The process of claim 1 wherein said non-conductive substrate is an optical fiber.

3. The process of claim 2 further including the step of dipping said selectively metallized optical fiber in an immersion gold solution to provide a gold plated fiber.

4. The process of claim 2 wherein stripping of at least a coating from an optical fiber provides said optical fiber having an uncoated portion.

5. The process of claim 2 wherein said sensitizer solution contains about 10 g stannous chloride per liter of 0.4 M hydrochloric acid in de-ionized water.

6. The process of claim 2, wherein said stannous salt solution contains from about 0.5 g to about 200 g stannous chloride per liter of hydrochloric acid having a strength of from about 0.05M to about 5.0M in de-ionized water.

7. The process of claim 6 wherein said stannous salt solution contains about 10 g stannous chloride per liter of 0.4 M hydrochloric acid in de-ionized water.

8. A process for applying a metal to selected areas of a plurality of optical fibers comprising the steps of:

providing a plurality of optical fibers having uncoated portions in an array having a separation between fibers of said plurality of optical fibers;

sensitizing the surface of each of said uncoated portions using a sensitizer solution to provide sensitized portions of said plurality of optical fibers;

treating said sensitized portions with an activator solution to provide activated portions of said plurality of optical fibers;

coating said activated portions with a stannous salt solution to form at least one activated area and at least one deactivated area within each on said activated portions to provide masked portions therefrom; and immersing said masked portions of said plurality of optical fibers in an electroless plating bath to deposit a metal on said at least one activated area of each of said activated portions of said plurality of optical fibers to provide selectively metallized fibers.

9. The process of claim 8, wherein said separation is at least 1.0 mm.

10. The process of claim 8 further including the step of dipping said selectively metallized fibers in an immersion gold solution to provide a gold plated fibers.

11. The process of claim 8 wherein said sensitizer solution contains about 10 g stannous chloride per liter of 0.4 M hydrochloric acid in de-ionized water.

12. The process of claim 8, wherein said stannous salt solution contains from about 0.5 g to about 200 g stannous chloride per liter of hydrochloric acid having a strength of from about 0.05M to about 5.0M in de-ionized water.

13. The process of claim 12 wherein said stannous salt solution contains about 10 g stannous chloride per liter of 0.4 M hydrochloric acid in de-ionized water.

* * * * *